United States Patent
Lamere et al.

(10) Patent No.: US 12,277,163 B2
(45) Date of Patent: Apr. 15, 2025

(54) SYSTEMS AND METHODS FOR MEDIA PLAYLIST GENERATION

(71) Applicant: Spotify AB, Stockholm (SE)

(72) Inventors: Paul Lamere, Bath, ME (US); Zachary Damien Shaw, Arlington, MA (US); Aaron Paul Harmon, New York, NY (US); Marcus Daniel Better, Arlington, MA (US)

(73) Assignee: Spotify AB, Stockholm (SE)

( * ) Notice: Subject to any disclaimer, the term of this patent is extended or adjusted under 35 U.S.C. 154(b) by 253 days.

(21) Appl. No.: 18/048,799

(22) Filed: Oct. 21, 2022

(65) Prior Publication Data

US 2024/0134902 A1 Apr. 25, 2024
US 2024/0232250 A9 Jul. 11, 2024

(51) Int. Cl.
*G06F 16/00* (2019.01)
*G06F 16/432* (2019.01)
*G06F 16/438* (2019.01)

(52) U.S. Cl.
CPC ........ *G06F 16/4387* (2019.01); *G06F 16/432* (2019.01)

(58) Field of Classification Search
CPC ..... G06F 8/35; G06F 8/31; G06F 8/20; G06F 40/103; G06F 16/432; G06F 16/4387
See application file for complete search history.

(56) References Cited

U.S. PATENT DOCUMENTS

| 11,681,769 B2 * | 6/2023 | Crisp ............... G06F 16/951 707/736 |
| 2007/0174866 A1 | 7/2007 | Brown et al. |
| 2013/0305145 A1 * | 11/2013 | Jackson ............ G06F 40/103 715/246 |
| 2015/0178280 A1 | 6/2015 | DiMaria et al. |
| 2016/0274872 A1 | 9/2016 | Narayanan et al. |
| 2019/0129587 A1 | 5/2019 | Reese et al. |

OTHER PUBLICATIONS

Create, edit and delete Smart Playlists in Music on Mac, Apple Music User Guide, https://support.apple.com/en-in/guide/music/mus1712973f4/mac.

* cited by examiner

*Primary Examiner* — Yicun Wu
(74) *Attorney, Agent, or Firm* — Morgan, Lewis & Bockius LLP

(57) ABSTRACT

The various implementations described herein include methods and devices for identifying and presenting content to users. In one aspect, a method includes providing a domain specific language (DSL) tool to a user of the computing device and receiving a plurality of user inputs via the DSL tool. The plurality of user inputs includes: an input identifying a DSL object corresponding to a media pool; an input identifying a DSL object corresponding to a mutator to be applied to the media pool; and inputs identifying a plurality of DSL objects corresponding to respective objectives for a media set list. The method also includes generating the media set list from the media pool based on the mutator and the objectives and presenting information about the generated media set list to the user.

19 Claims, 8 Drawing Sheets

SYSTEMS AND METHODS FOR MEDIA PLAYLIST GENERATION

TECHNICAL FIELD

The disclosed embodiments relate generally to media provider systems including, but not limited to, systems and methods for generating and evaluating media playlists.

BACKGROUND

Recent years have shown a remarkable growth in consumption of digital goods such as digital music, movies, books, and podcasts, among many others. The overwhelmingly large number of these goods often makes navigation of digital goods an extremely difficult task. It can be difficult for end users (e.g., consumers) to select the music they want to listen to and, as a result, media streaming providers often provide playlists or queues of media content. However, generating, evaluating, and revising playlists can be time-consuming and challenging for set designers.

SUMMARY

A curated set of tracks may be subjected to a range of constraints and parameters that impact the curation. Even simple sets may have many competing requirements that influence the content and sequencing of the set.

Current processes for creating a curated set of tracks can require a dedicated team of engineers each time a new experience is to be defined and developed. These processes can also require the allocation of machines and resources and may involve coding complicated custom code that can be used to scale up to millions of end users. Generally, testing then occurs in a sequential development workflow. Such a process can take weeks or months to complete, meaning that there may not be sufficient time for multiple iterations of the process for improving and refining the set.

Some shortcomings of the current processes can include: they are not scalable, it can be difficult to adjust or iterate, it can be difficult to ensure best practices are followed, it can be challenging for engineers to understand and optimize bounds and targets, and it can be difficult to monitor performance after publication.

The systems of the present disclosure include tools (e.g., hardware/software components) that (i) enable a set designer (also sometimes called a content designer) to develop a set definition (e.g., a playlist formula), and (ii) instantiate the set definition into a playlist (e.g., personalized for a given end user (e.g., a listener/consumer) or cohort). These tools allow set designers (e.g., persons developing curated sets of tracks for consumption) to quickly define a set to demonstrate a new personalized listening experience (e.g., without requiring engineering and/or coding skills). The disclosed systems further provide for a set designer to iterate on the set until it meets the set designer's expectations and then deliver that listening experience at scale to end users. The disclosed systems can also ensure that the delivered content meets quality standards and business goals.

The disclosed systems include a domain-specific language (DSL) that provides a means for set designers (who may not have engineering or coding skills) to define a set in terms of the domain vocabulary. A result is that instead of writing code that inspects fields, set designers can articulate their requirements and input these into the system using plain, readable language. For example, a set designer can specify that a particular set: (i) have an artist separation of at least four tracks, (ii) have no more than two tracks from the same album, and (iii) be optimized for discovery.

An example workflow with the disclosed systems is as follows. First, a set designer with an idea for a new listening experience uses the DSL to define a first iteration of the listening experience. Next, the set designer uses a workbench to verify that the set definition is valid and has the intended properties. Then, the set designer uses the workbench to generate the set for a cohort of end users for evaluation. The set designer can inspect quality reports as well as the set contents to determine if the set is providing the desired listening experience. Next, the set designer can adapt the content by iterating upon the set definition and repeating the validation and evaluation steps until the content matches the desired listening experience and meets standards of set quality. Then, the set designer uses the workbench to publish the set definition. At this point, the set is available to be delivered to end users (listeners/consumers). Depending upon how the set is configured, it may be available for all end users on-demand or for a cohort of end users that are explicitly activated for the set. In this example, online objective metrics for the published set are continually updated and notifications are sent to the set designer if the metrics fall out of bounds. The set designer monitors the performance of the set over time, e.g., correlating objective offline and online metrics with end user behavior. Additionally, the set designer can compare metrics for the new set to other sets to better understand how the new set fits into a portfolio of sets. If the listening experience is ready to be retired, the set designer uses the workbench to unpublish the set definition. The set will no longer be made available to end users (e.g., listeners/consumers) and resources devoted to set generation can be reclaimed. The history of evaluation and monitoring data can be retained.

In accordance with some embodiments, a method of playlist generation is provided. The method is performed at a computing device having one or more processors and memory. The method includes: (i) providing a domain specific language (DSL) tool to a user of the computing device (e.g., a set designer); (ii) receiving a plurality of user inputs via the DSL tool, the plurality of user inputs including: (a) an input identifying a DSL object corresponding to a media pool; (b) an input identifying a DSL object corresponding to a mutator to be applied to the media pool; and (c) inputs identifying a plurality of DSL objects corresponding to respective objectives for a media set list; (iii) generating the media set list from the media pool based on the mutator and the objectives; and (iv) presenting information about the generated media set list to the user (e.g., presenting an evaluation of the generated media set list to the set designer for review, revision, and/or publication to end users).

In accordance with some embodiments, an electronic device is provided. The electronic device includes one or more processors and memory storing one or more programs. The one or more programs include instructions for performing any of the methods described herein (e.g., the methods 400 and 700).

In accordance with some embodiments, a non-transitory computer-readable storage medium is provided. The non-transitory computer-readable storage medium stores one or more programs for execution by an electronic device with one or more processors. The one or more programs comprising instructions for performing any of the methods described herein (e.g., the methods 400 and 700).

Thus, devices and systems are disclosed with methods for playlist generation and evaluation. Such methods, devices, and systems may complement or replace conventional methods, devices, and systems for playlist generation and evaluation.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The disclosed embodiments enable a set designer to quickly define a set to demonstrate a new listening experience without requiring engineering or coding skills. The set designer is able to iterate on the experience until it meets the set designer's expectations and then deliver that experience at scale to end users. The disclosed embodiments also include procedures for ensuring that the delivered content meets quality standards and business goals. The disclosed embodiments also include procedures for monitoring how well the delivered sets are meeting the objectives of the set as outlined by the set designer in the set definition.

The disclosed embodiments include a domain-specific language for defining sets and a set of tools for use by the set designers to manage aspects of the set development life cycle, including set definition, publishing, monitoring, and updating. In this way, a set designer can change a set definition and immediately (e.g., within 10, 30, or 60 seconds) see the effect of the change on a cohort of end users. In some embodiments, evaluation is included in each step of the process and evaluation results are published to the set designer as part of the workflow. In some embodiments, a history of changes and evaluations is stored to allow review and analysis of the effect of various changes.

Media Content Delivery System

Figure 1:
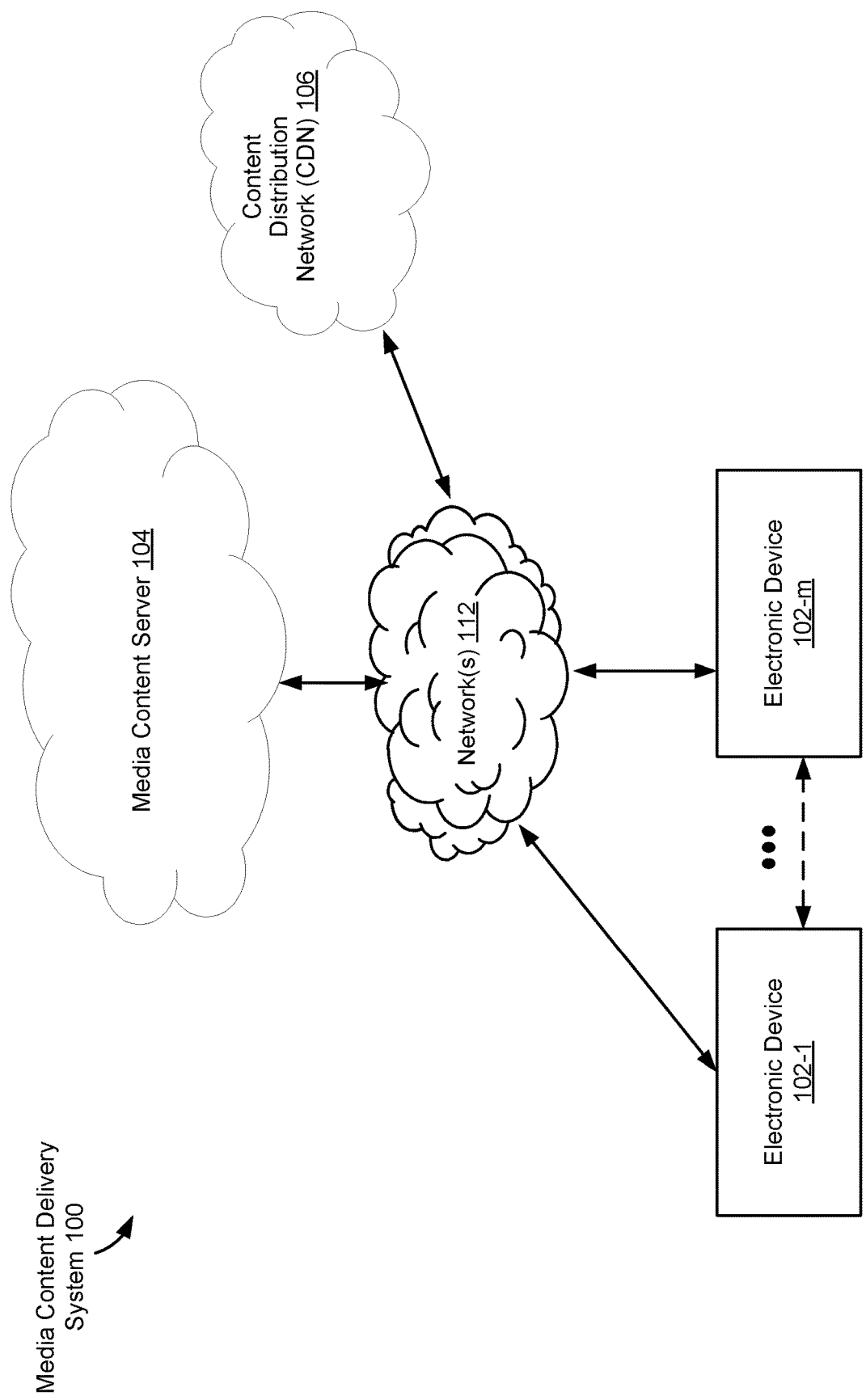
FIG. 1 is a block diagram illustrating a media content delivery system in accordance with some embodiments.

FIG. 1 is a block diagram illustrating a media content delivery system 100 in accordance with some embodiments. The media content delivery system 100 includes one or more electronic devices 102 (e.g., electronic device 102-1 to electronic device 102-m, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users (e.g., one or more set designers and/or end users). In some embodiments, an electronic device 102 is a personal computer, mobile electronic device, wearable computing device, laptop computer, tablet computer, mobile phone, feature phone, smart phone, an infotainment system, digital media player, a speaker, television (TV), and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, podcasts, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222

(FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by an end user, a set designer, and/or an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
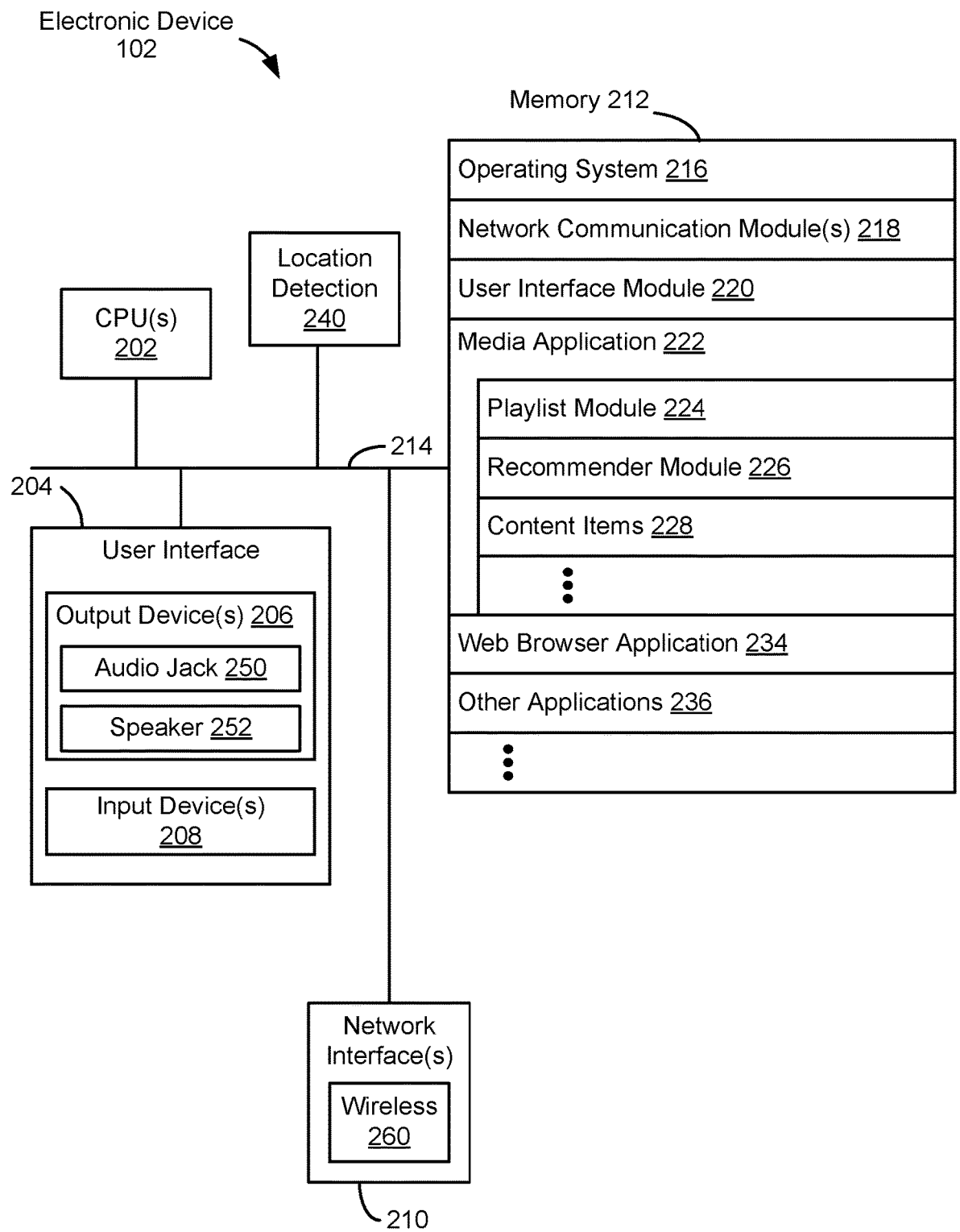
FIG. 2 is a block diagram illustrating an electronic device in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), e.g., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the client device 102 to other computing devices (e.g., media presentation system(s), media content server 104, and/or other client devices) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
  - a playlist module 224 for storing sets of media items for playback in a predefined order;
  - a recommender module 226 for identifying and/or displaying recommended media items to include in a playlist;
  - a content items module 228 for storing media items, including audio items such as podcasts and songs, for playback and/or for forwarding requests for media content items to the media content server;
- a web browser application 234 for accessing, viewing, and interacting with web sites; and
- other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
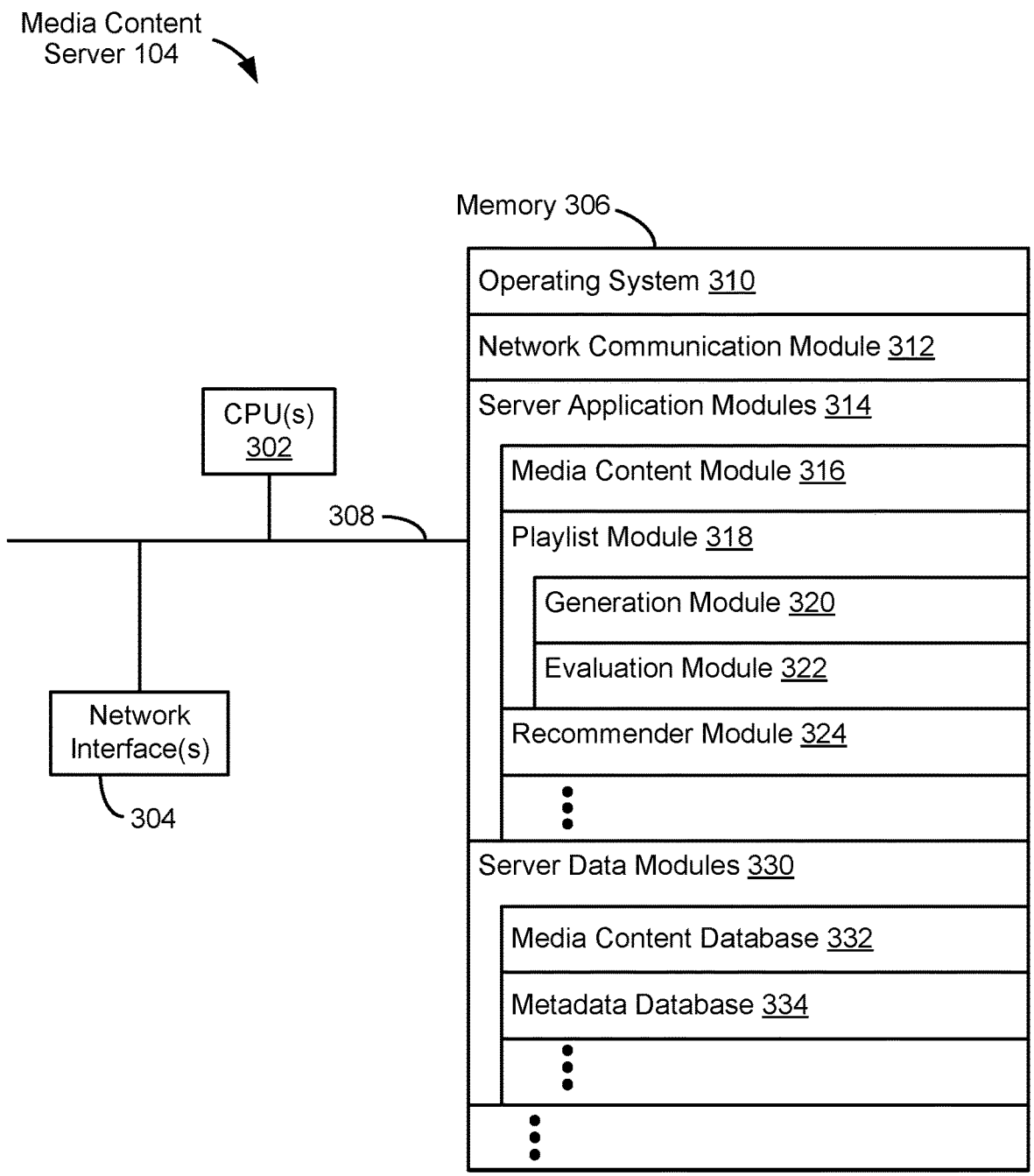
FIG. 3 is a block diagram illustrating a media content server in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random-access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
  - a media content module 316 for storing one or more media content items and/or sending (e.g., streaming), to the electronic device, one or more requested media content item(s);
  - a playlist module 318 for storing and/or providing (e.g., streaming) sets of media content items to the electronic device. In some embodiments, the playlist module 318 includes one or more of: a generation module 320 for generating playlists and media sets; and an evaluation module 322 for evaluating the playlists and media sets, e.g., before and after publication;
  - a recommender module 324 for determining and/or providing recommendations for a playlist; and
- one or more server data module(s) 330 for handling the storage of and/or access to media items and/or metadata relating to the media items; in some embodiments, the one or more server data module(s) 330 include:
  - a media content database 332 for storing media items; and
  - a metadata database 334 for storing metadata relating to the media items, such as a genre associated with the respective media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (e.g., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

DSL System and Workbench

A DSL system of the present disclosure allows set designers (e.g., content creators and editors) to create programmed experiences by combining pre-defined building blocks into a listening session. In some embodiments, the DSL system allows set designers to create listening experiences using YAML-based domain-specific language. Previously, creating a new set may have involved creating a new backend service, potentially a new data pipeline, and a large amount of new code. In some situations, with the DSL system of the present disclosure, the time from idea to a testable prototype is greatly reduced and rapid iteration is possible.

In some embodiments, the DSL system combines elements of traditional playlist creation, such as metadata decoration, filtering, transformation, and sequencing. In some embodiments, the DSL system includes a module for candidate generation that is flexible, personalized, and responsive to set designer feedback. In some embodiments, the sets generation uses shared media pools to access a wide range of media sources. In some embodiments, the playlists are sequenced, e.g., using machine learning-based sequencing. In some embodiments, set generation includes narration capabilities, e.g., for narrating introductions, transitions, and conclusions within playlists.

In some embodiments, sets are generated in a batch for a targeted end user cohort. In some embodiments, a web interface (e.g., an online GUI) for the DSL is used to assist a set designer with generating a set. In some situations, the batch approach improves efficiency as compared to the web interface approach. In some situations, the web interface approach improves interactivity, response time, and/or iteration timing.

Figure 4:
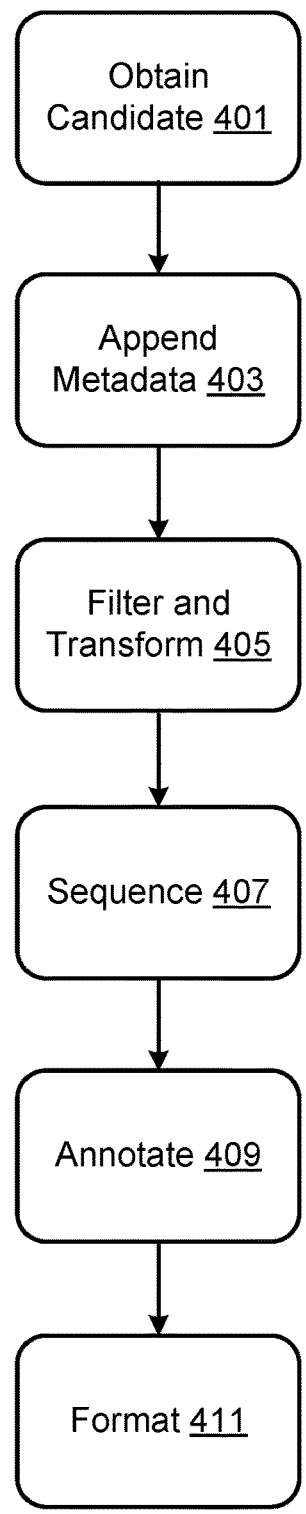
FIG. 4 is a flow diagram illustrating a method for set generation in accordance with some embodiments.

FIG. 4 is a flow diagram illustrating a method 400 for set generation in accordance with some embodiments. The method 400 may be performed at a computing system (e.g., media content server 104 and/or electronic device(s) 102) having one or more processors and memory storing instructions for execution by the one or more processors. In some embodiments, the method 400 is performed by executing instructions stored in the memory (e.g., memory 212, FIG. 2 and/or memory 306, FIG. 3) of the computing system. In some embodiments, the method 400 is performed by a combination of a server system (e.g., including media content server 104 and CDN 106) and a client device (e.g., an electronic device 102).

The system obtains (401) a candidate set, such as a set generated by a user (e.g., set designer) using a DSL (e.g., the method 700). In some embodiments, the system appends (403) metadata to the candidate set (e.g., metadata relating to the media of the candidate set, such as title, artist name, album name, length, genre, and mood). In some embodiments, the metadata includes acoustic metadata, cultural metadata, and/or explicit metadata. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, or vocalness. Cultural metadata may include text-based information describing end users' reactions to a track or song, such as styles, genres, moods, themes, similar artists and/or songs, or rankings. Explicit metadata may include album and song titles, artist and composer names, other credits, album cover art, publisher name and product number, and other information.

In some embodiments, the system accesses a candidate pool. In some embodiments, the candidate pool includes media content items that are candidates for inclusion into the candidate set. In some embodiments, the candidate pool includes a repository of media content items (e.g., several thousand or million media content items). In some embodiments, the media content items include audio content items and/or video content items (which would also typically include audio). In some embodiments, the media content items in the candidate pool have already been pre-filtered from a larger set (e.g., repository) of media content items. For example, in some embodiments, the media content items in the candidate pool include media content items that have been selected for a specific end user (for whom the playlist is being generated). In some embodiments, the media content items have been selected for the specific end user based on the specific end user's listening history and/or current context (e.g., time of day, location, etc.). In some embodiments, the system pulls (e.g., considers) all of the media items in candidate pool to fill a slot in the set. In some embodiments, the candidate pool includes many thousands or millions of items and the system pulls a predefined batch of candidate items (e.g., 100 items selected at random) to fill a slot in the set.

In some embodiments, the system filters and/or transforms (405) the set. In some embodiments, media items are filtered based on cosine distance between a seed item and all the items in the set. In some embodiments, explicit media items are filtered out. In some embodiments, the filtering includes filter based on playability and/or user preferences. In some embodiments, media items in the candidate set are transformed into a different format or style.

In some embodiments, the system checks if the selected candidate passes constraints. In some embodiments, the selected candidate item is checked against a plurality of constraints. The plurality of constraints define disqualification criteria for excluding media items from the respective slot in the sequence of media items. In some embodiments, the plurality of constraints for the respective slot in the sequence of media items includes at least one constraint that is based on already-populated slots in the sequence of media items (e.g., the system checks that the selected candidate meets the constraints with respect to the sequencer state). In accordance with a determination that the selected candidate has passed the constraints, the selected candidate item is added to the set and the sequencer state is updated, and the process is repeated for the next slot in the sequence of media items (e.g., using the updated sequencer state). On the other hand, in accordance with a determination that the selected candidate does not pass constraints, a new candidate is selected using the selection strategy. In some embodiments, the loop of checking if the selected candidate passes constraints and selecting a scored candidate item repeats until a selected candidate item passes the constraints or there are no remaining scored candidate items. In the latter case, in some embodiments, the constraints are relaxed (according to a priority of the constraints), and the loop is repeated.

In some embodiments, the system sequences (407) media items in the set. In some embodiments, sequencing the media items includes generating respective weights for the media items and ranking the media items in accordance with the weights. In some embodiments, the weights are assigned based on one or more objectives for the candidate set.

In some embodiments, the system keeps track of a sequencer state that indicates an order of media content items that have already been added to the set (e.g., already-populated slots in the sequence of media items). In some embodiments, the set of constraints are varied based on the media content items that have already been added to the playlist (e.g., the constraints are dynamically updated, for each respective slot). At the outset (e.g., when populating slot or index 0), there are no media content items in the set (e.g., the sequencer state is null). Thus, the only constraints to be applied to index 0 are global constraints (e.g., constraints that do not depend on already-populated slots in the sequence of media items).

In some embodiments, the system calculates (e.g., for each candidate) objective scores for each of a plurality of objectives. For example, the objectives may include listener-based objectives (e.g., such as maximizing the number of "likes," maximizing the length of the listening session, minimizing the number of skips, etc.) as well as artist-based objectives (e.g., an objective to promote certain tracks or artists, an objective to provide the end user with a greater diversity of music so as to attract the end user to new music, etc.). In addition, some objectives may depend on the sequencer state (e.g., by penalizing placement of two songs by the same artist in close proximity to one another).

In some embodiments, the system aggregates the objective scores for each candidate. In some embodiments, objective scores are aggregated according to an aggregation function. In some embodiments, objective scores are aggregated using a weighted average (e.g., the aggregation function is a weighted average function). In some embodiments, the objective scores are aggregated using an ordered weighted average. In some embodiments, the objective scores are aggregated using a hierarchical ordered weighted average. In any event, the output of the aggregation function is typically a single value representing an overall score for the candidate.

In some embodiments, the system selects a scored candidate using a selection strategy. For example, in some embodiments, the system selects the highest scored candidate (e.g., the candidate item with the highest aggregated score). In some embodiments, the system randomly selects a candidate from the candidates with scores above a predefined threshold (e.g., randomly selects one of the top 10 or 100 scored candidates).

In some embodiments, the system annotates (409) the set, e.g., with one or more labels that describe the set. In some embodiments, the annotations include one or more descriptors for the set. In some embodiments, the annotations include narration for the set. In some embodiments, the system formats (411) the set. Example formats for a set include the PLS format and the M3U format. In some embodiments, the system includes one or more components (e.g., the evaluation module 322) configured to parse and evaluate set definitions.

Figure 5:
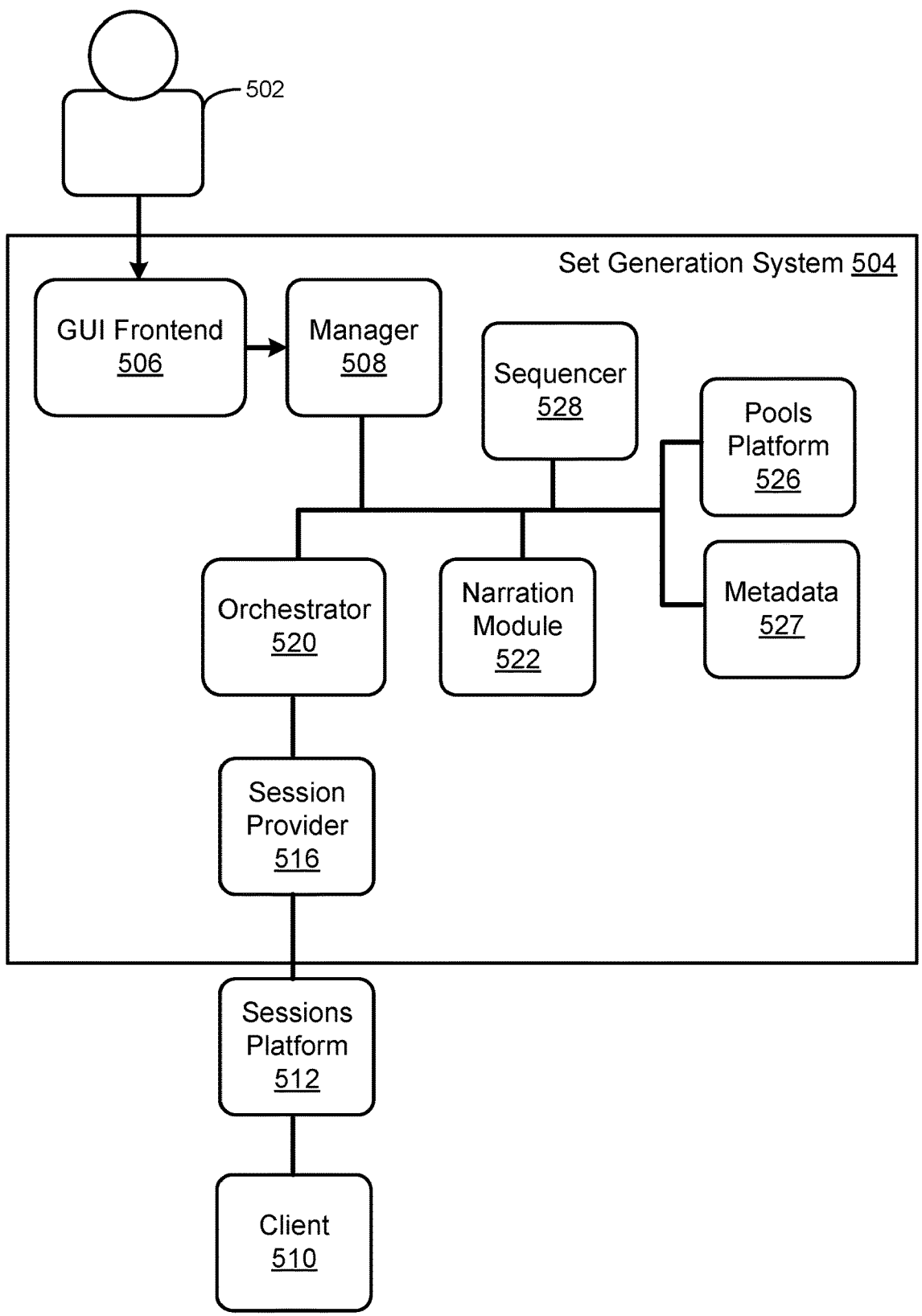
FIG. 5 is a block diagram illustrating a set generation system in accordance with some embodiments.

FIG. 5 is a block diagram illustrating a set generation system 504 in accordance with some embodiments. In some embodiments, the media content server 104 includes the set generation system 504. In some embodiments, the set generation system 504 is an instance of the playlist module 318 or the generation module 320. In some embodiments, the set generation system 504 handles generating lists of content (e.g., playlists, watch feeds, and media item recommendations).

A set designer 502 can create a listening experience (e.g., a set definition) by interacting with a graphical user interface (GUI) frontend 506. In some embodiments, the set designer 502 generates the set definition via a domain specific language (e.g., a YAML-based domain-specific language). In some embodiments, the GUI frontend 506 is an application configured for set generation and management. The set definition generated via the GUI frontend 506 is stored using a manager 508 (e.g., a set and configuration manager). In some embodiments, the manager 508 includes a repository for media list configurations and set definitions. In some embodiments, the manager 508 is configured to allow the set designer to create and/or edit configurations.

The manager 508 is communicatively coupled to an orchestrator 520 configured to orchestrate workflow for the defined sets. In some embodiments, a narration module 522 is coupled and configured to annotate sets with narration. The orchestrator 520 is coupled to a pools platform 526 that includes one or more media item pools and a sequencer 528 that sequences the media items selected from the pools based on objectives and constraints of the set definition. In some embodiments, the pools platform 526 is, or includes, the media content database 332. In some embodiments, the orchestrator 520 manages one or more of: (i) request formatting and routing, (ii) API and protocol definitions, (iii) performance monitoring, (iv) operations and tooling, and (v) logging orchestration.

In some embodiments, one or more candidate sources are added (e.g., ad hoc) via a candidate provider API. In some embodiments, the sequencer 528 and the orchestrator 520 are combined into a single component (e.g., the generation module 320). In some embodiments, the orchestrator 520 is coupled to a metadata service 527 that provides metadata for media content items and set candidates (e.g., metadata from the metadata database 334). In some embodiments, the set generation system 504 generates sets in batches (e.g., to improve runtime performance). In some embodiments, a batch architecture uses a pipeline that generates sets based on the YAML descriptions. In some embodiments, an end user cohort is provided as an input dataset and generated sets are written to a database for serving. In some embodiments, the pools platform 526 exposes supported candidate sources via a uniform abstraction. In some embodiments, media items are sourced from existing datasets. In some embodiments, components are packaged together with a runner that processes a YAML description (e.g., co-located in a pipeline repository) and iteratively builds the pipeline. In some situations, a batch approach is less flexible, as it cannot easily accommodate dynamism, whether in input sources or in rapidly changing attributes such as interactivity and popularity. Some embodiments include a hybrid approach, where segment and candidate selection occur in batch, but the final sequencing is deferred to runtime.

A session provider 516 and sessions platform 512 manage client sessions (e.g., provide dynamic client sessions) and push content to a client device 510. In some embodiments, the client device 510 is an instance of the electronic device 102. In some embodiments, the client device 510 includes a streaming application for media content. In some embodiments, set generation is initiated by the client device 510 requesting a session from the sessions platform 512 (e.g., in response to a navigation event). In some embodiments, only a portion of a set (e.g., a page) is generated at one time (e.g., per client request). In some embodiments, a set is generated (e.g., sequenced) in segments (e.g., one segment per invocation). For example, a set segment can include 5, 10, or 20 media items (e.g., tracks). In some embodiments, set segments are processed in parallel (e.g., each proceeding in accordance with the method 400). In some embodiments, the filtering operation 405 is performed sequentially across set segments (e.g., to ensure appropriate deduplication) and other operations of the method 400 (e.g., obtaining candidates 401 and annotation 409) are performed in parallel across set segments.

The present disclosure describes a system that provides for the rapid creation of listening experiences. In accordance with some embodiments, the system includes a workbench of tools (e.g., the GUI frontend 506) that can be used by a set developer for managing the lifecycle of a set and delivering listening experiences at scale. In some embodiments, the workbench allows a set designer to understand the quality of the listening experience being delivered. The workbench includes a set of tools that a set designer uses to interact with the DSL system in order to manage the lifecycle of a set. In some embodiments, the workbench provides one or more of the following capabilities. (1) Validates a set definition given a prospective set definition (in DSL) to verify that the prospective set is properly formed. In some embodiments, for valid set definitions, the workbench provides summary information about the set. In some embodiments, for invalid set definitions, the workbench provides syntax and grammar level error messages to allow a set designer to address the issues. (2) Generates a set for an end user or a cohort of end users given a set definition. In some embodiments, the workbench produces contents in a browse-able format. (3) Evaluates a set by generating sets for a cohort of end users and producing cohort reports that show summary information about the generated content, which can be used by a set designer to get an understanding of the set behavior and to determine if the set meets quality standards. (4) Publishes a set given a valid set definition to make the set available to be served at scale to end users. (5) Updates a set including updating the definition of a published set. (6) Unpublishes a set by making the given set no longer be available to end users. (7) Monitors content for a set including, for a published set, reporting on content for the set. In some embodiments, the reporting includes one or more of: (i) offline reports having information on how well the set conforms to best practices and objectives as defined in the set definition for cohorts of end users; (ii) online reports having information on how well the set conforms to best practices and objectives as defined in the set definition for a sample of end users receiving the set; and (iii) historical reports having information on how the properties of a set have changed over time. (8) Provides portfolio management including providing the ability to view information about a current set portfolio. In some embodiments, the information about the current set portfolio includes one or more of: (i) which sets are currently active, (ii) the number of end users associated with each set, and (iii) quality reports across the portfolio of sets.

In some embodiments, the workbench includes a command line tool for managing sets. In some embodiments, the workbench includes a web dashboard for reviewing set content, quality reports, and the overall portfolio. In some embodiments, the workbench supports an introspection API that allows a set builder tool to query the capabilities of the DSL. In this way, as the capabilities of the DSL are expanded, the set building tools update and adapt automatically.

Domain-Specific Language and Set Definitions

In various embodiments, the domain-specific language of the present disclosure has one or more of the following features: (1) Provides a domain-specific method of defining listening experiences that hides the complexities inherent in delivering these experiences at scale. (2) Provides a single point of definition for a listening experience that defines all aspects of the listening experience including listening objectives, business objectives, quality metrics and guardrails, packaging, and delivery. (3) Supports generating listening experiences for all types of items including music tracks, podcast episodes, shows, albums, artists, and playlists. (4) Supports the ability to draw items from a wide range of sources including playlists, candidate pools, user collections, personalized sets, and search indices. (5) Supports the ability to decorate items with metadata from a wide range of data sources including the basic metadata, audio attributes, descriptors, genres, user-affinity, user-relevance, user-satisfaction, and other prioritized signals. (6) Supports the ability to filter items based on metadata for the items. For example, a filter can be applied to remove all restricted discovery content from the feed. (7) Supports the ability to transform items. For example, a transform can be applied that transforms unplayable tracks to playable versions of the tracks. As a further example, a track may be unplayable due to licensing restrictions in a particular region, whereas another version of that track may be licensed for play in that region and can be substituted for the non-playable version without affecting the listening experience. (8) Supports the ability to prioritize content based upon item attributes. (9) Supports multiple prioritized objectives for a set. (10) Supports standard playlist hygiene constraints such as deduplication, minimum artist and album separation, playability filtering, and restricted discovery filtering. (11) Supports generating listening experiences with multiple segments, where each segment is allowed to have its own filters, transforms, objectives, and constraints. (12) Supports general as well as feature-specific annotation of listening experiences, including narration and metadata. (13) Supports the capability to add machine-learned attributes to the filters, transforms, and objectives used to select and sequence items. (14) Supports adapting content based on context including day of the week, the time of day, the device type (e.g., mobile, desktop, car, or home). (15) Supports adapting content based upon the end user's familiarity or affinity to the set or any particular segment within the set. (16) Supports adapting content based on implicit or explicit feedback the end user gives about the set.

In some embodiments, a set is defined via a data serialization language (e.g., a YAML file). In some embodiments, the set definition has the following structure. (1) A 'main' section that includes general information about the set being defined. (2) A 'components' section that describes one or more components that are used to generate the content. (3) An optional 'evaluation' section that describes how the set should be evaluated. (4) An optional 'includes' section that lists files (e.g., YAML files) to be included. (5) An optional 'strings' section that lists string definitions used by annotators.

In some embodiments, the 'main' section describes the overall set including the set name, detailed description, set ID, update rate, top-level component, and other set-level attributes. An example 'main' section is shown below in Definition Example 1:

---
Definition Example 1: Main section
---
```
main:
   tag: personal-music-and-news
   name: Personal Music & News
   description: A mix of music and news made for you.
   top-level-component: Music&News
   period: daily
   availability: on-demand
   limit: 50
   categories:
      - endless
      - personalized
   annotations:
      - narration
   history-depth:
```
---

In Definition Example 1 the 'main' section describes a set with the set ID 'personal-music-and-news' that is updated daily and a first component of 'Music&News'. In some embodiments, the tag is the name used to find the particular set. In some embodiments, the 'main' section has at least a subset of the following properties: (1) A 'tag' property that is the identifier for the set in the system. In some embodiments, the 'tag' property is required to be unique across all sets. In some embodiments, the 'tag' property is used as part of the set URI (e.g., datab:lexus:personal-music-and-news). (2) A 'name' property that is the human-readable name of the set. (3) A 'description' property that is the human-readable description of the set. (4) A 'top-level-component' property that is the main component of the system. (5) A 'period' property that is how often the set is updated (e.g., daily, weekly, monthly, twice-daily, twice-weekly, twice-monthly, never, or an integer interval in seconds). (6) An 'availability' property that is how the set is made available to end users. (7) A 'limit' property that is the desired length of the set (e.g., as a maximum value, range, or 'endless'). In some embodiments, a page size is specified to indicate a length of the pages of the set. (8) A 'categories' property that is a list of free-form text tags used to classify the set. (9) A 'history-depth' property that is how many set generations deep to use for variety filtering. (10) An 'annotations' property that is a list of annotations that should be applied to the resulting set.

In some embodiments, the 'main' section has one or more of the following properties. (11) A 'global-filters' property that is a list of filters that are applied to all items. (12) A 'metadata' property that is a list of metadata items that should be included in the set. (13) A 'variants' property that is information to control how a set with variants (e.g., a daily mix or seed mix) should be built. (14) A 'shuffle' property that controls shuffling behavior of the set.

In some embodiments, a set has one or more 'component' sections. In some embodiments, a function of a 'component' section is to supply a sequence of items. In some embodiments, a set of components is created and connected to build a desired behavior. In some embodiments, a 'component' section has at least a subset of the following properties: (1) A 'name' property that is the name of the component. In some embodiments, if the name is omitted, the component ID is used as the name. (2) A 'description' property that is a detailed description of the component. (3) A 'type' property that is the type of component. (4) A 'limit' property that is the maximum number of items that the component is allowed to produce. (5) A 'mutators' property that is a list of one or more transform(s), filter(s), and/or orderer(s) to be applied to items of the set. In some embodiments, a transform turns one type of item into another (e.g., a show to an episode, or a track to a playable track). In some embodiments, a filter removes undesirable items (e.g., non-recommendable, unplayable, or low energy) from the set. In some embodiments, an orderer puts the items in a particular order. (6) An 'objectives' property that is a list of objectives used to sequence items. (7) An 'annotation' property used by an annotation processor. (8) An 'item-types' property that is a list of item types that the component may return. For example, the item types can include any combination of: any, track, episode, artist, playlist, show, or album. (9) An 'on-error' property that controls how the component behaves when encountering errors. In some embodiments, specific component subtypes have additional configurable properties.

In some embodiments, the flow of items through a component are as follows: (1) items are retrieved from the underlying source (e.g., a playlist or pool); (2) each mutator is applied to the list of items; (3) top limit items are selected and made available; and (4) objectives defined for the component are used to select and sequence items from the component. In some embodiments, applying a mutator includes: (i) decorating the list of items with any data necessary for the mutator; and (ii) applying the mutator to yield a (new) list of items.

In some embodiments, the component subtypes include a source subtype and a composite subtype. In some embodiments, a source subtype is a source of items (e.g., tracks, or episodes). Example sources include playlists, pools, shows, user-collections, personalized sets, and artist radio. In some embodiments, a composite subtype can filter, order, sequence, or otherwise combine items from one or more components into a sequence of items.

In some embodiments, source components are a source of items that provide an ordered list of items. In some embodiments, sources are able to order, filter, transform and limit the items produced. In some embodiments, source components include a 'type' property that is the type of source component. Example source types include playlist, pool, discover-weekly, repeat-rewind, user-top-tracks, user-collection, user-track-plays, and charts. An example source component is shown below in Definition Example 2:

---
Definition Example 2: Source component
---
```
todays-top-hits:
   limit: 100
   mutators:
      - random
   type: playlist
   item-types: track
   uri: datab:playlist:397i3qdQZF2DFc
```
---

The source component in Definition Example 2 is called 'todays-top-hits' and returns a set of items from the playlist in a random order.

In some embodiment, composite components pull items from one or more subcomponents, which can be raw sources or composites. In some embodiments, these items are filterable and sequence-able. An example composite component is shown below in Definition Example 3:

---
Definition Example 3: Composite component
---
Snippets:
  name: Snippets
  description: A mix of new and familiar music
  item-types: track
  objectives:
    - standard-sequencing-objectives
    - name: max-tracks-per-artist
      type: item-count
      field: track_metadata.primary_artist_uri
      max-value: 1
  source-mutators: random
  sources:
    - weekly-mix: 8
    - daily-mix-1: 8
    - new-releases: 8
    - summer-tracks: 8

---

In Definition Example 3 a set of up to 32 tracks is generated with tracks drawn from Weekly Mix, Daily Mix 1, New Releases, and Summer Tracks. In some embodiments, the tracks meet playlist hygiene requirements with a more stringent constraint on max-tracks-per-artist in the set. In some embodiments, the playlist has four segments that appear in a random order and have eight tracks in each.

In some embodiments, composite components have a 'sources' property that is a list of sub-components and associated (optional) information from which items should be drawn. In some embodiments, the components are represented by their IDs. In some embodiments, components in a source list can also include a limit that indicates how many items should be used from the component (e.g., as illustrated in Definition Example 3). Due to sequencing constraints, it may be necessary for a composite to draw more items from a source than the limit before it can find items that will be useable in the set. In some embodiments, a limit is a range and the limit is chosen at random from within the range.

In some embodiments, source orderings may require additional data to be associated with each source. For example, a probabilistic source ordering may require that each source be tagged with a probability indicating how likely that source is to be selected. Definition Example 4 below shows a probabilistic source definition:

---
Definition Example 4: Probabilistic source ordering
---
source-mutators: probabilistic
sources:
  - source: weekly-mix
    limit: 4
    probability: 50
  - source: on-repeat
    limit: 4
    probability: 30
  - source: summer-tracks
    limit: 4
    probability: 20

---

In Definition Example 4 the sources are reordered based on their associated probabilities with 'weekly-mix' having a 50% chance of being first in the list, 'on-repeat' having a 30% chance of being first, and 'summer-tracks having a 20% chance of being first.

In some embodiments, the 'source-mutators' property is a list of mutators that control how the sources in the source list should be ordered and/or filtered. In some embodiments, source mutators include: sequential, random, alphabetical, user-relevance, user-engagement, user-feedback, user-score, day-of-week, day-of-epoch, round-robin, probabilistic, limit, and light-shuffle.

In some embodiments, multiple source mutators are applied. For example, a combination of 'user-relevance' and 'light-shuffle' places the sources in user-relevance order and then lightly shuffles them. Another example source-order pattern is to combine the limit ordering with another ordering to select the best component for a specific criterion. For example, a combination of 'user-relevance' and 'limit: 1' selects the most relevant source from a list of sources.

In some embodiments, a 'reuse-sources' property identifies whether a subsource can be reused. In some embodiments, when 'reuse-sources' is set to false, each time that composite is used as a source it will draw from its next source.

In some embodiments, each component has a list of mutators that are used to transform, filter, or sort items to be returned by a component. In some embodiments, a component mutator includes one or more orderers that are used to order items in a certain way. In some embodiments, a component mutator includes one or more filters that are used to remove unwanted items from consideration in that component. In some embodiments, a global filter list specified in a main section applies to all components. In some embodiments, the filter(s) includes an energy filter, a playability filter and/or a banned-artists filter.

In some embodiments, a filter has configurable values that control how the filter operates. In some embodiments, filters have at least a subset of the following properties: (1) an 'invert' property that, if set to true, inverts the filter; and (2) an 'on-missing' property that defines the behavior if data required to apply the filter is missing. In some embodiments, options for the 'on-missing' property include: (i) a drop option that sets the item as removed from consideration, (ii) a keep option that sets the item as retained, (iii) an abort option that stops the set building process and records an error in a set ledger.

In some embodiments, the support filters include at least a subset of: (i) a 'recommendable' filter that only allows items that do not have restricted discoverability, (ii) a 'component-types' filter that only allow items that match at least one of the item types of the component, and (iii) a 'types' filter that only allows items that match a given type. In some embodiments, the 'types' filter includes a 'match' parameter where types must match one of the given types. In some embodiments, the 'types' filter includes a 'not-match' parameter where types must not match one of the given types. In some embodiments, the support filters include at least a subset of: (iv) a 'playable' filter that only allows items that are playable by the end user, (v) an 'unbanned' filter that only allow items that have not been banned by the end user, a 'match' filter that only allows items that have a field that matches a configured value, (vi) a 'range' filter that only allows items that have a field that falls within a given range, (vii) a 'familiar' filter that only allows items familiar to the end user, and (viii) a standard-music filter that allows a combination of playable, unbanned, and recommendable tracks.

A component mutator can include one or more transforms. A transform takes items and potentially turns them into different items. Example transforms include: (i) a playable-track transform that takes a list of items and replaces any tracks that are not playable with playable alternatives; (ii) a track-to-artist transform that replaces tracks with their primary artists; and (iii) an artist-to-track transform that replaces artists with up to N top tracks by that artist. In some embodiments, if an item cannot be transformed, it is dropped. In some situations, a single item is transformed into zero, one, or multiple items.

In some embodiments, the DSL includes a multi-objective sequencer that allows sequencing of items based upon a set of objectives. In some embodiments, a multi-objective sequencer is configured with one or more objectives. Using the objectives, the sequencer generates an ordered list of items that meets the set of objectives in accordance with some embodiments.

In some embodiments, a component in a set definition includes a set of objectives for that component. In some embodiments, the objectives for all components are combined and used by the sequencer to generate the sequence of items. In some embodiments, each objective has one or more of the following parameters: (1) A 'name' parameter that is the name of the objective. (2) A 'type' parameter that is the type of the objective. (3) A 'weight' parameter that indicates the relative importance of the objective. In some embodiments, the weight parameter values include disabled, very-low, low, medium, normal, high, very-high, and unbreakable. (4) An 'invert' parameter that, if set to true, invert the objective (e.g., 'maximize' becomes 'minimize' and 'match' becomes 'does not match'). (5) An 'include-span' parameter that restricts particular objectives to a given set of slots in the output list. For example, this allows a set designer to have a different set of objectives for the first ten tracks. (6) An 'exclude-span' parameter that indicates a list of playlist slot ranges where the objective should not apply. (7) An 'include-sources' parameter that restricts objectives to apply only to items from a particular set of component sources. In some embodiments, this parameter allows a set designer to specify a set of component sources. In some embodiments, items that are from any of these sources have this objective applied. (8) An 'exclude-sources' parameter where items from the list of exclude-sources will not have this objective applied to it.

In various embodiments, the following objectives are supported: (1) A 'match' objective that prefers items that have a value of a given field that matches a given value. (2) A 'target' objective that prefers items that have a value for a specified field that are close to a specified target value. (3) A 'range' objective that prefers items that have a value for a specified field that falls within a specified range. (4) A 'match-distribution' objective where matching items are represented at a given target-percentage in the generated sequence of items. (5) A 'range-distribution' objective where matching items should fall within the given distribution range. (6) A 'min-separation' objective where matching items should be at least the given number of items away from similar matching items. (7) A 'max-occurrences' objective where no more than the given number of matching items should appear in the set. (8) A 'balance' objective where item values for a given field are balanced across the set.

In some embodiments, a standard set of objectives can be used to generate sets with good playlist hygiene. In some embodiments, the standard set of objectives include at least a subset of the following attributes: min-artist-separation, max-tracks-per-artist, max-episodes-per-show, max-tracks-per-album, min-album-separation, deduplicate-items, fuzzy-deduplicate-items, and relaxable-constraints. The relaxable-constraints include a list of constraints (e.g., min-artist-separation or max-tracks-per-album) that should not be applied to items that are from a relaxed source. In some embodiments, set designers are allowed to disable or override any of these standard objectives.

In some embodiments, an evaluation section is used to configure how a set will be evaluated. An example evaluation section is shown in Definition Example 5 below:

---
Definition Example 5: Evaluation section
---
```
evaluation:
    histograms:
        - track_metadata.year_of_release
    guardrails:
        user_track_data.user_satisfiaction:
            min-value: 0.75
            cohort: US
              user_track_data.user_satisfaction:
                  min-value: 0.75
            cohort: US-boomer
              user_track_data.user_satisfaction:
                  min-value: 0.85
            cohort: US-genz
              user_track_data.user_satisfaction:
                  min-value: 0.25
    scheduled-evaluations:
        - name: global-eval
          enabled: true
          period: weekly
          cohort: GLOBAL
        - name: us-premium
          enabled: true
          period: weekly
          cohort: US
    fields-of-interest:
        - track_metadata.year_of_release
```
---

In some embodiments, a set is tailored to a particular end user or context. For example, a set is tailored to give an end user tracks from one of their top artists. In some embodiments, the DSL supports personalization variables that can be used when constructing a set. In some embodiments, the personalization variables include at least a subset of: (1) a 'user.top_artists' variable that is a list of the top N artist URIs for the end user; (2) a 'user.top_genres' variable that is a list of the top N genre URIs for the end user; (3) a 'user.discovery_artists' variable that is a list of the top N discovery artists for the end user; (4) a 'user.nostalgia_artists' variable that is a list of the top N nostalgia artists for the end user; (5) a 'user.top_editorial_playlists' variable that is a list of the top N editorial playlists for the end user; (6) a 'user.top_own_playlists' variable that is a list of the top N user-owned playlists for the end user; (7) a 'user.tracks_played_in_last_day' variable that is a list of tracks played by the end user in the previous day; (8) a 'user.top_tracks_cluster_1' variable that is top tracks of an end user's primary cluster; (9) a 'user.top_tracks_cluster_N' variable that is top tracks of an end user's Nth most primary cluster; and (10) a 'user.uid' variable that is the UID of the end user.

In some embodiments, component fields are used as personalization variables. For example, an 'on-repeat' component that returns seed ranked tracks for the end user can be used as a variable for track radio by assigning it as a seed (e.g., seed: $on-repeat.uris:0). As another example, a variable (e.g., on-repeat.artist_names:0) is used to reference the artist name of the first track in the 'on-repeat' component.

In some situations, the variable described above resolve to lists. In some embodiments, the lists are post processed with one or more post processors. For example, a range (e.g., 0-5) uses the first N items of the list, 'random' shuffles the list, 'reverse' reverses the list, 'unique' retains only unique items, and 'day-of-week' reorders the items based on the day of the week. For example, on Monday the first item is first, and on Tuesday the second item is first.

In some embodiments, post processors are applied by appending them to the variable name with a separator (e.g., ':'). In some embodiments, multiple processors can be applied. For example, $user.top_artists provides the full list of top artist URIs for the end user, $user.top_artists:0-5 provides the first 5 top artists for an end user, $user.top_artists:0 provides the top artist for an end user, $user.top_artists:random provides the top artists for an end user in random order, $user.top_artists:0-5:random provides the top 5 artists for an end user in random order, $user.top_artists:0-7:day-of-week provides the top 7 artists of an end user, ordered by the day of the week, $user.top_artists:0-5:round-robin provides the top 5 artists of an end user, cycled through as they are used, $user.top_artists:0-5:random:round-robin cycles through the top 5 artists of an end user in random order, and $user.top_artists:0-5:random:pop provides the top 5 artists of an end user in random order without reuse. In some situations, personalization variables resolve to a list of URIs (e.g., that can then be used wherever a URI or a list of URIs are needed). In some embodiments, the DSL definition includes a variables section. In the variables section arbitrary string mappings can be used as variable substitutions throughout the components.

In some embodiments and situations, sets are built as families. For example, a family 'Daily Mix' is a family of six sets. In some embodiments, the DSL supports defining a family of sets with a single set definition via variants. For example, a set designer can create a 'Decade Hits' definition as shown in Definition Example 6 below:

---

Definition Example 6: Family set definition

---

```
main:
   tag: hits-of-the-$variant
   name: Hits of The $variant
   description: The biggest songs of the $variant, made for you.
   categories: personalized, algotorial, decades
   period: on-demand
   limit: 40
   history:
      depth: 3
      max-reuse: 3
   variants:
      - 70s:
         min-year-of-release: 1970
         max-year-of-release: 1979
      - 80s:
         min-year-of-release: 1980
         max-year-of-release: 1989
   global-filters:
      - range:
         field: year-of-release
         min: $min-year-of-release
         max: $min-year-of-release
      - standard-music-filter
```

---

In Definition Example 6, the 'main' section includes a variants subsection that contains a list of variants. Each entry in the variant list includes the variant name (e.g., 70s and 80s), as well as variables defined when building the set for that particular variant. In this example, 'min-year-of-release' and 'max-year-of-release' are defined based on the decade and are used in the global filters for the set. In Definition Example 6, the variant name is also used to build the tag and name of the set.

In some embodiments, annotators are used to attach extra information to generated sets for a particular purpose. For example, the 'endless-narration' annotator adds narration intro and outro information to items in the generated set based upon the contents of the set, along with context (e.g., day-of-week), and end user activity (e.g., is-new-listener or is-heavy-listener). In some embodiments, the 'endless-narration' annotator adds speech synthesis markup language (SSML) metadata to items.

In some embodiments, components can specify the types of items that they provide. For example, item types can include track, episode, album, artist, playlist, show, and genre. In some embodiments, a component provides items of multiple types, for example, a playlist source component can provide track or episode items. In some embodiments, composite components can specify the expected type for each source. In some embodiments, at compile time, the system determines whether the types between sources and sinks match, and an error is generated if a mismatch occurs.

In some embodiments, the DSL gives control over how errors are handled at the component level. A set may consist of a number of components that draw items from a wide range of sources. Sometimes a component may encounter an error when trying to produce items. For example, this could be due to an error in an underlying service used by the component, missing metadata that the component relies upon, empty sources or taste data, a misconfigured component and the like. In some embodiments, the DSL provides the ability of the set designer to control what happens for the various types of errors. In some embodiments, the error types include: (i) a service error where an error is encountered in an underlying service, (ii) a config error where an error is encountered in the configuration of the component, (iii) a metadata error where a required piece of item metadata is missing, (iv) a type-mismatch error where an item of an unexpected type is encountered, (v) an empty error where the component can't produce the data, and (vi) an internal error where an error occurred within a component.

In some embodiments, the error responses includes one or more of: (i) an abort response where the set building process is stopped, no set is generated, and the error is recorded in the set ledger; (ii) an empty response where the component returns an empty set of items; and (iii) a best-effort response where the component returns any items that it can.

In some embodiments, a set designer can control how a component responds to the various types of errors by setting an on-error parameter. In some embodiments, each component has an on-errors section that can be used to configure the error response style for the various error types. In some embodiments, a component that encounters an error logs the error in a set ledger and responds to the error based upon the component configuration.

In some embodiments, a component can be used more than once in a set definition. For example, a component can generate a list of tracks alternating between an end user's 'on-repeat' and 'weekly-mix' components as illustrated below in Definition Example 7.

---

Definition Example 7: Alternating components

---

```
my-daily-mix:
   sequencer: sequential
   sources:
      - on-repeat: 10
      - weekly-mix: 1
      - on-repeat: 10
      - weekly-mix: 1
      - on-repeat: 10
      - weekly-mix: 1
```

| Definition Example 7: Alternating components |
| --- |
| on-repeat:<br>  limit: 15<br>  type: on-repeat |

In Definition Example 7, the second and subsequent usages of on-repeat in the my-daily-mix component are referencing the same component. Since the on-repeat component is configured to only produce at most 15 items in this example, the my-daily-mix component produces a sequence as follows: 10 on repeat tracks, 1 discover weekly track, 5 on repeat tracks, 2 discovery weekly tracks. In some embodiments, a set designer can prevent the cross-dependency by assigning unique identifiers to each usage (e.g., "on-repeat-1", "on-repeat-2", etc.).

Definition Example 8 below shows an example of a complete set definition:

| Definition Example 8: Full set definition |
| --- |
| ## 70s Hits<br>## main block<br>main:<br>  tag: 70s-hits<br>  name: 70s Hits<br>  description: The biggest songs of the 1970s.<br>  entry: 70sHitsPool<br>  limit: 30<br>## evaluation block<br>evaluation:<br>  histograms: - track_metadata.year_of_release<br>  guardrails:<br>    user_track_data.user_satisfaction:<br>      min-value: 0.75<br>    cohort: US<br>      user_track_data.user_satisfaction:<br>        min-value: 0.75<br>      cohort: US-boomer<br>        user_track_data.user_satisfaction:<br>          min-value: 0.85<br>      cohort: US-genz<br>        user_track_data.user_satisfaction:<br>          min-value: 0.25<br>  scheduled-evaluations:<br>  - name: global-eval<br>    enabled: true<br>    period: weekly<br>    cohort: GLOBAL<br>  - name: us-premium<br>    enabled: true<br>    period: weekly<br>    cohort: US<br>  fields-of-interest:<br>  - track_metadata.year_of_release<br>## components block<br>components:<br>  70sHitsPool:<br>    type: algo-pool<br>    uri: datab:playlist:37i9dQZF1DWTJ7<br>    mutators:<br>    - name: year-filter<br>      type: range-filter<br>      field: track_metadata.year_of_release<br>      min-value: 1970<br>      max-value: 1979<br>    - standard-mutators<br>    objectives:<br>    - standard-objectives<br>    # balance user-satisfaction, interactivity, and other factors<br>    - name: maximize-balancing-score<br>      type: maximize<br>      field: user_track_data.balancing_score<br>    # make sure that all years are equally represented |

| Definition Example 8: Full set definition |
| --- |
| - name: balance-years<br>- type: balance<br>  field: track_metadata.year_of_release |

In some embodiments, after a set definition is received from a set designer, an evaluation is performed (e.g., by the evaluation module 322). In some embodiments, the evaluation is performed in accordance with the evaluation block in the set definition. An example evaluation result is shown below in Definition Example 9:

| Definition Example 9: Evaluation Output |
| --- |
| #70s Hits Evaluation<br># General Info<br>set: 70s-Hits<br>cohort: US<br>num playlists: 1000<br>Number of playlists with errors: 1000<br>Number of unique sets: 1<br>Number of set generation failures: 0<br># Playlist hygiene issues<br>- too many tracks per artist found in 1000 sets<br>- duplicate tracks found in 1000 sets<br>- too many tracks per album found in 1000 sets<br>- min artist separation too low in 1000 sets<br>- min album separation too low in 1000 sets<br>- unplayable tracks found in 292 sets |

As shown in Definition Example 9, the evaluation is performed on a given cohort (e.g., US end users cohort) and presents results including errors and hygiene issues.

Set Generation and Presentation Processes

Figure 6A:
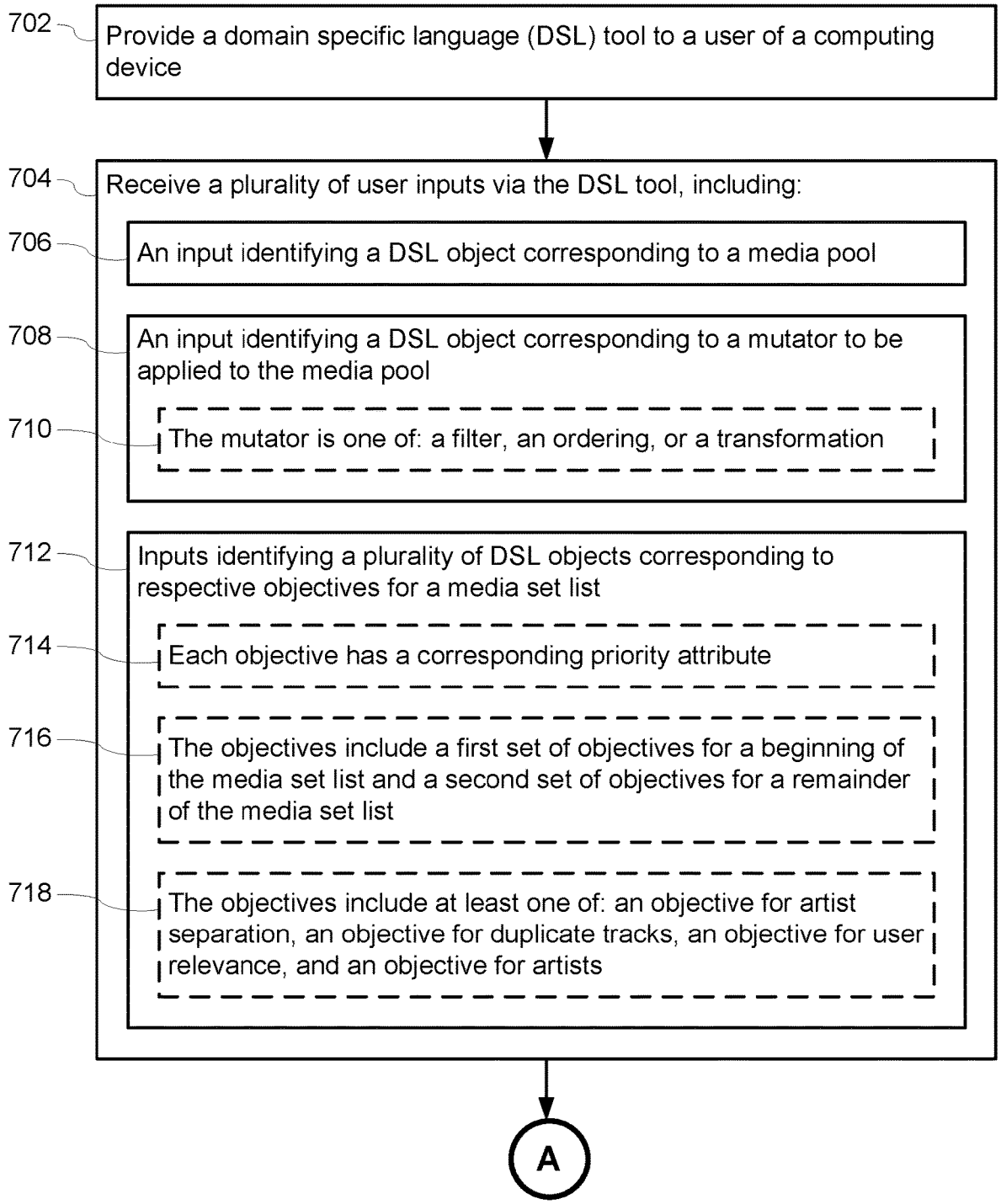
FIGS. 6A-6C are flow diagrams illustrating a method of recommending content to an end user in accordance with some embodiments.
Figure 6B:
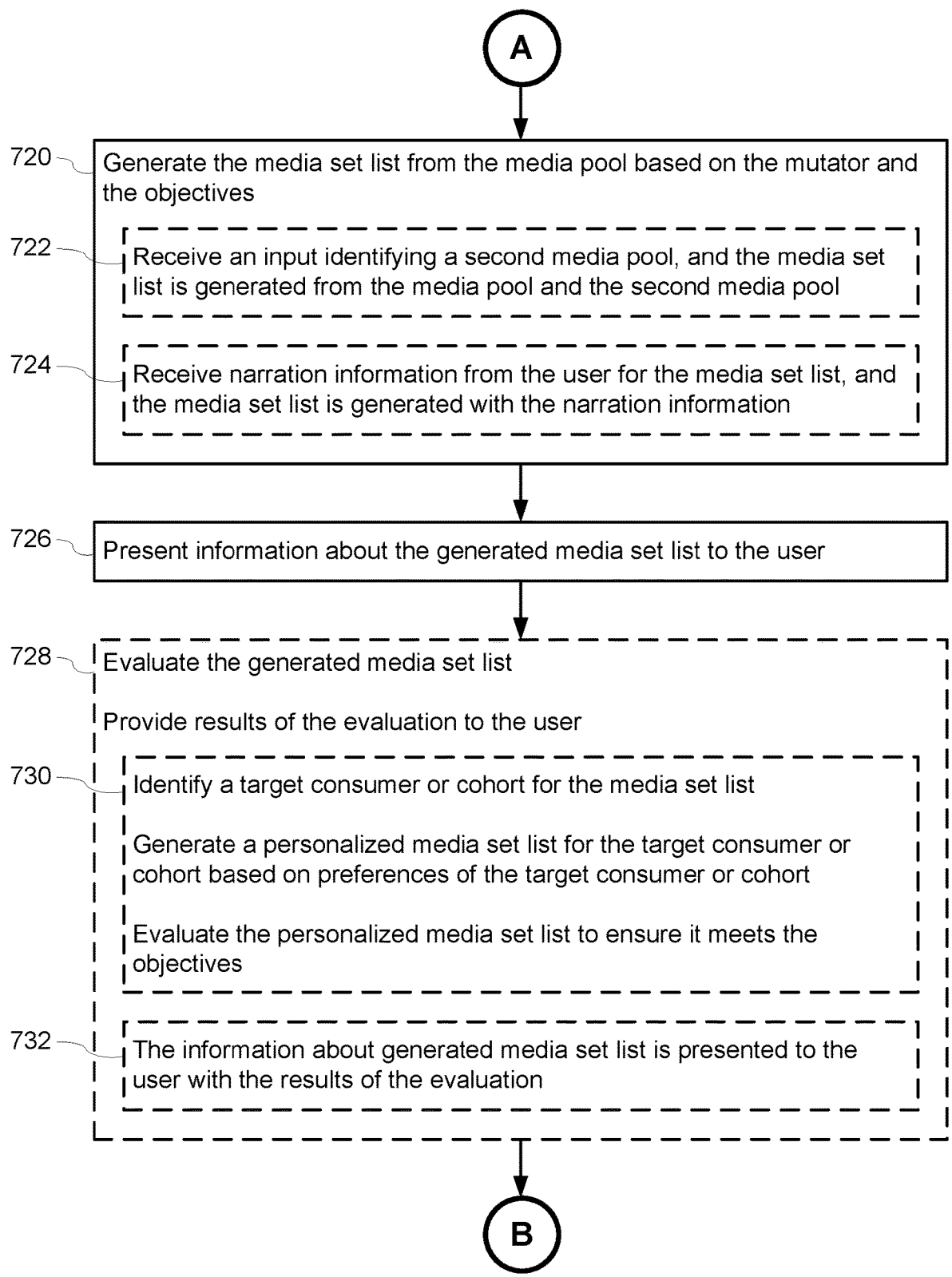
Figure 6C:
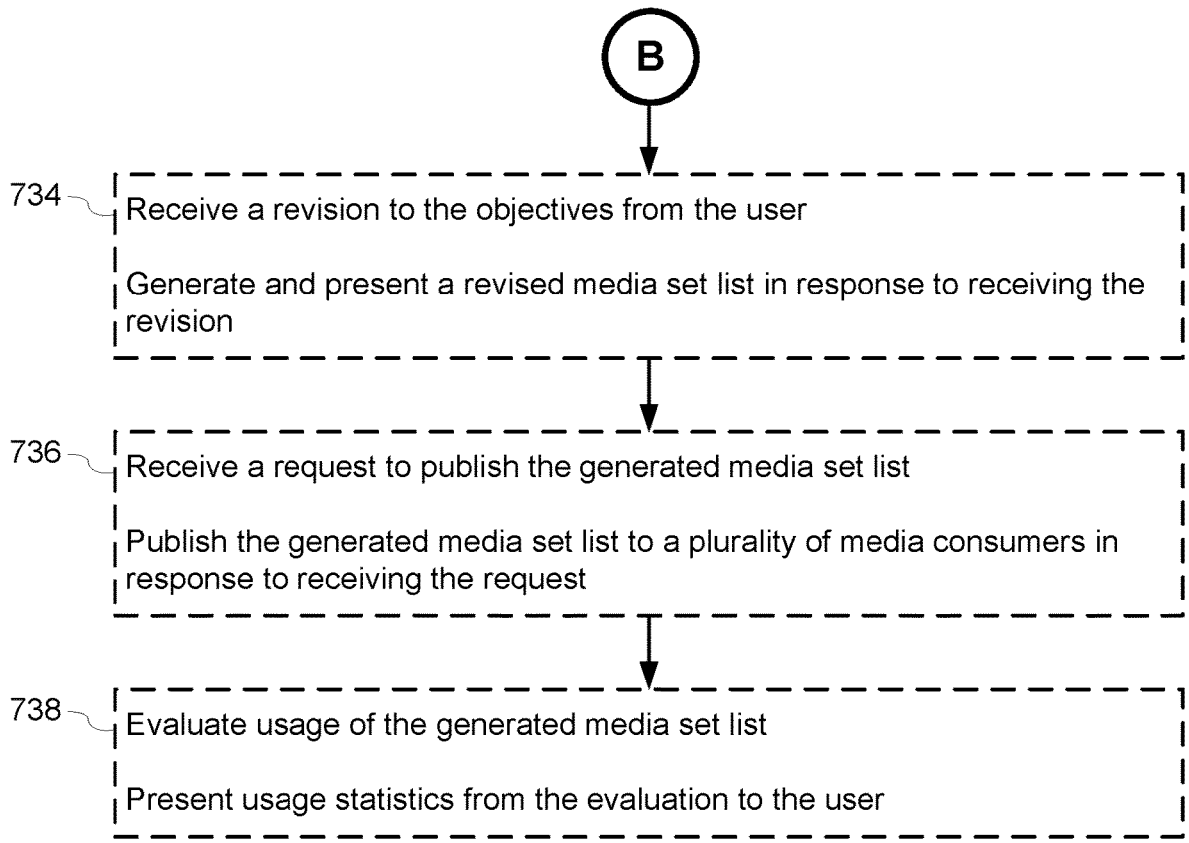

FIGS. 6A-6C are flow diagrams illustrating a method 700 of identifying and presenting content for end users in accordance with some embodiments. The method 700 may be performed at a computing system (e.g., media content server 104 and/or electronic device(s) 102) having one or more processors and memory storing instructions for execution by the one or more processors. In some embodiments, the method 700 is performed by executing instructions stored in the memory (e.g., memory 212, FIG. 2 and/or memory 306, FIG. 3) of the computing system. In some embodiments, the method 700 is performed by a combination of the server system (e.g., including media content server 104 and CDN 106) and a client device. In some embodiments, the method 700 is performed by the set generation system 504.

The system provides (702) a domain specific language (DSL) tool to a user (e.g., a set designer) of a computing device. For example, the system provides the GUI frontend 506 to the set designer 502 (e.g., via the generation module 320).

The system receives (704) a plurality of user inputs (e.g., from the set designer) via the DSL tool, including: an input (706) identifying a DSL object corresponding to a media pool (e.g., a media pool in the pools platform 526), an input (708) identifying a DSL object corresponding to a mutator to be applied to the media pool, and inputs (712) identifying a plurality of DSL objects corresponding to respective objectives for a media set list (e.g., as illustrated in Definition Example 8). In some embodiments, the mutator is (710) one of: a filter (e.g., filtering out explicit or duplicative items), an ordering, or a transformation. In some embodiments, the plurality of user inputs include one or more inputs identifying a set of mutators for the media pool. In some embodiments, each objective has (714) a corresponding priority attribute (e.g., a respective weight).

In some embodiments, the objectives include (716) a first set of objectives for a beginning of the media set list (e.g., an objective for the first 5, 10, or 20 media items) and a second set of objectives for a remainder of the media set list.

In some embodiments, the objectives include (718) at least one of: an objective for artist separation, an objective for duplicate tracks, an objective for user relevance, and an objective for artists. For example, Definition Example 3 shows an objective for max tracks per artist.

The system generates (720) the media set list from the media pool based on the mutator and the objectives. For example, the orchestrator 520 generates the media set list based on a set definition received from the manager 508.

In some embodiments, the system receives (722) an input identifying a second media pool, and the media set list is generated from the media pool and the second media pool.

In some embodiments, the system receives (724) narration information from the user for the media set list, and the media set list is generated with the narration information. For example, Definition Example 3 shows a set with tracks drawn from four sources (e.g., media pools).

The system presents (726) information about the generated media set list to the user (e.g., the set designer). For example, information about the generated media set list is presented to the user via the client device 510 and the sessions platform 512.

In some embodiments, the system evaluates (728) the generated media set list and provides results of the evaluation to the user. For example, the set shown in Definition Example 8 is evaluated in accordance with the evaluation block and results are provided to the set designer (e.g., as shown in Definition Example 9).

In some embodiments, the system identifies (730) a target end user or cohort for the media set list, generates a personalized media set list for the target end user or cohort based on preferences of the target end user or cohort, and evaluates the personalized media set list to ensure it meets the objectives. For example, the all-out-70s set is evaluated in Definition Example 9 for the 'US' cohort. In some embodiments, information about the generated media set list is presented (732) to the user with the results of the evaluation.

In some embodiments, the system receives (734) a revision to the objectives from the user and generates, and presents a revised media set list in response to receiving the revision. For example, the set designer 502 may revise the objectives for the set shown in Definition Example 8 based on the evaluation results shown in Definition Example 9.

In some embodiments, the system receives (736) a request to publish the generated media set list, and publishes the generated media set list to a plurality of media end users (e.g., listeners/consumers) in response to receiving the request.

In some embodiments, the system evaluates (738) usage of the generated media set list, and presents usage statistics from the evaluation to the user. For example, the system can evaluate how a generated set performs over time for different cohorts.

Although FIGS. 6A-6C illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 700) of identifying and presenting content for users. The method is performed at a computing device (e.g., the electronic device 102 or the media content server 104) having one or more processors and memory. The method includes: (i) providing a domain specific language (DSL) tool (e.g., the GUI frontend 506) to a user (e.g., a set designer) of the computing device; (ii) receiving a plurality of user inputs via the DSL tool, the plurality of user inputs including: (a) an input identifying a DSL object corresponding to a media pool (e.g., a source identifier); (b) an input identifying a DSL object corresponding to a mutator to be applied to the media pool (e.g., a source mutator such as user-engagement or day-of-week); and (c) inputs identifying a plurality of DSL objects corresponding to respective objectives for a media set list; (iii) generating (e.g., via the orchestrator 520 or the generation module 320) the media set list from the media pool based on the mutator and the objectives; and (iv) presenting information about the generated media set list to the user (e.g., statistics, summary information, evaluation results, and/or media items in the set). In some embodiments, the objectives include one or more of: min-artist-separation, max-tracks-per-artist, max-episodes-per-show, max-tracks-per-album, min-album-separation, deduplicate-items, fuzzy-deduplicate-items, and relaxable-constraints. In some embodiments, the user inputs include one or more inputs identifying one or more DSL objects, each DSL object corresponding to one or more media pools. In some embodiments, the user inputs include one or more inputs identifying one or more DSL objects, each DSL object corresponding to one or more mutators. In some embodiments, the method further includes providing (e.g., delivering and/or presenting) the media set list to one or more end users (e.g., consumers/listeners).

(A2) In some embodiments of A1, the method further comprises receiving an input identifying a second media pool, where the media set list is generated from the media pool and the second media pool. For example, a set designer may identify multiple media pools (e.g., sources) in a set definition for a particular media set list as illustrated in Definition Example 3. For example, the first media pool may be 'weekly-mix' and the second media pool may be 'summer-tracks.

(A3) In some embodiments of A1 or A2, each objective has a corresponding priority attribute (e.g., a weight or rank applied). In some embodiments, the user (e.g., the set designer) provides weights for each objective. In some embodiments, the weight parameter values include one or more of: disabled, very-low, low, medium, normal, high, very-high, and unbreakable.

(A4) In some embodiments of any of A1-A3, the mutator is one of: a filter, an ordering, or a transformation. For example, the mutator could be a filter to remove explicit content from the set. An example transformation transforms unplayable tracks to playable versions of the tracks. In some embodiments, the mutator is an ordering of the media items based on one or more item attributes.

(A5) In some embodiments of any of A1-A4, the objectives include a first set of objectives for a beginning of the media set list and a second set of objectives for a remainder of the media set list. In some embodiments, each objective of the objectives specifies a range within the set where the objective is to be applied (e.g., an objective for the first 10 media items and an objective for the last 5 media items).

(A6) In some embodiments of any of A1-A4, the method further comprises: (i) evaluating (e.g., via the evaluation module 322) the generated media set list; and (ii) providing results of the evaluation to the user (e.g., providing the results to the set designer via the GUI frontend 506).

(A7) In some embodiments of A6, evaluating the generated media set list includes: (i) identifying a target end user or cohort for the media set list; (ii) generating a personalized media set list for the target end user or cohort based on preferences of the target end user or cohort; and (iii) evaluating the personalized media set list to ensure it meets the objectives. In some embodiments, the set definition from the user identifies a target cohort and the generated set list is evaluated for the target cohort.

(A8) In some embodiments of A6 or A7, the information about generated media set list is presented to the user (e.g., the set designer) with the results of the evaluation (e.g., statistics, graphs, and/or charts).

(A9) In some embodiments of any of A1-A8, the method further comprises, after presenting the generated media set: (i) receiving a revision to the objectives from the user (e.g., via the GUI frontend 506); and (ii) in response to receiving the revision, generating and presenting a revised media set list (e.g., via the GUI frontend 506).

(A10) In some embodiments of any of A1-A9, the method further comprises receiving narration information from the user (e.g., the set designer) for the media set list, where the media set list is generated with the narration information (e.g., the annotate operation 409). In some embodiments, the narration information is received via a narration module (e.g., the narration module 522).

(A11) In some embodiments of any of A1-A10, the method further comprises: (i) receiving a request (e.g., via the GUI frontend 506) to publish the generated media set list; and (ii) in response to receiving the request, publishing the generated media set list to a plurality of end users (e.g., providing the generated media set list to an end user via the client device 510).

(A12) In some embodiments of any of A1-A11, the method further comprises, after publishing the generated media set list: (i) evaluating usage of the generated media set list; and (ii) presenting usage statistics from the evaluation to the user (e.g., presenting the usage statistics to the set designer via the GUI frontend 506). For example, the generated media set list is evaluated over time for one or more cohorts (e.g., to identify trends and/or deficiencies).

(A13) In some embodiments of any of A1-A12, the objectives include at least one of: an objective for artist separation, an objective for duplicate tracks, an objective for user relevance, and an objective for artists.

In another aspect, some embodiments include a computing system including one or more processors and memory coupled to the one or more processors, the memory storing one or more programs configured to be executed by the one or more processors, the one or more programs including instructions for performing any of the methods described herein (e.g., the methods 400 and 700 and A1-A13 above).

In yet another aspect, some embodiments include a non-transitory computer-readable storage medium storing one or more programs for execution by one or more processors of a computing system, the one or more programs including instructions for performing any of the methods described herein (e.g., the methods 400 and 700 and A1-A13 above).

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method performed at a computing device having one or more processors and memory, the method comprising:
   providing a domain specific language (DSL) tool for playlist creation to a user of the computing device;
   receiving a plurality of user inputs via the DSL tool, the plurality of user inputs including:
      an input identifying a DSL object corresponding to a media pool;
      an input identifying a DSL object corresponding to a mutator to be applied to the media pool; and
      inputs identifying a plurality of DSL objects corresponding to respective objectives for a playlist, wherein the playlist is an ordered sequence of media items and wherein the objectives include at least one of: an objective for separating tracks by the same artist within the playlist, an objective for avoiding duplicate tracks within the playlist, an objective for listener relevance, or an artist-based objective;

generating the playlist from the media pool, including ordering the sequence of media items, based on the mutator and the objectives; and presenting information about the generated playlist to the user.

2. The method of claim 1, further comprising receiving an input identifying a second media pool, wherein the playlist is generated from the media pool and the second media pool.

3. The method of claim 1, wherein each objective has a corresponding priority attribute.

4. The method of claim 1, wherein the mutator is one of: a filter, an ordering, or a transformation.

5. The method of claim 1, wherein the objectives include a first set of objectives for a beginning of the playlist and a second set of objectives for a remainder of the playlist.

6. The method of claim 1, further comprising:
evaluating the generated playlist; and
providing results of the evaluation to the user.

7. The method of claim 6, wherein evaluating the generated playlist includes:
identifying a target end user or cohort for the playlist;
generating a personalized playlist for the target end user or cohort based on preferences of the target end user or cohort; and
evaluating the personalized playlist to ensure it meets the objectives.

8. The method of claim 6, wherein the information about the generated playlist is presented to the user with the results of the evaluation.

9. The method of claim 1, further comprising, after presenting the generated playlist:
receiving a revision to the objectives from the user; and
in response to receiving the revision, generating and presenting a revised playlist.

10. The method of claim 1, further comprising receiving narration information from the user for the playlist, wherein the playlist is generated with the narration information.

11. The method of claim 1, further comprising:
receiving a request to publish the generated playlist; and
in response to receiving the request, publishing the generated playlist to a plurality of end users.

12. The method of claim 1, further comprising, after publishing the generated playlist:
evaluating usage of the generated playlist; and
presenting usage statistics from the evaluation to the user.

13. A computing device, comprising:
one or more processors;
memory; and
one or more programs stored in the memory and configured for execution by the one or more processors, the one or more programs comprising instructions for:
providing a domain specific language (DSL) tool for playlist creation to a user of the computing device;
receiving a plurality of user inputs via the DSL tool, the plurality of user inputs including:
an input identifying a DSL object corresponding to a media pool;
an input identifying a DSL object corresponding to a mutator to be applied to the media pool; and
inputs identifying a plurality of DSL objects corresponding to respective objectives for a playlist, wherein the playlist is an ordered sequence of media items and wherein the objectives include at least one of: an objective for separating tracks by the same artist within the playlist, an objective for avoiding duplicate tracks within the playlist, an objective for listener relevance, or an artist-based objective;
generating the playlist from the media pool, including ordering the sequence of media items, based on the mutator and the objectives; and
presenting information about the generated playlist to the user.

14. The computing device of claim 13, wherein the one or more programs further comprise instructions for receiving an input identifying a second media pool, and wherein the playlist is generated from the media pool and the second media pool.

15. The computing device of claim 13, wherein the mutator is one of: a filter, an ordering, or a transformation.

16. The computing device of claim 13, wherein the one or more programs further comprise instructions for:
identifying a target end user or cohort for the playlist;
generating a personalized playlist for the target end user or cohort based on preferences of the target end user or cohort; and
evaluating the personalized playlist to ensure it meets the objectives.

17. A non-transitory computer-readable storage medium storing one or more programs configured for execution by a computing device having one or more processors and memory, the one or more programs comprising instructions for:
providing a domain specific language (DSL) tool for playlist creation to a user of the computing device;
receiving a plurality of user inputs via the DSL tool, the plurality of user inputs including:
an input identifying a DSL object corresponding to a media pool;
an input identifying a DSL object corresponding to a mutator to be applied to the media pool; and
inputs identifying a plurality of DSL objects corresponding to respective objectives for a playlist, wherein the playlist is an ordered sequence of media items and wherein the objectives include at least one of: an objective for separating tracks by the same artist within the playlist, an objective for avoiding duplicate tracks within the playlist, an objective for listener relevance, or an artist-based objective;
generating the playlist from the media pool, including ordering the sequence of media items, based on the mutator and the objectives; and
presenting information about the generated playlist to the user.

18. The non-transitory computer-readable storage medium of claim 17, wherein the one or more programs further comprise instructions for receiving an input identifying a second media pool, and wherein the playlist is generated from the media pool and the second media pool.

19. The non-transitory computer-readable storage medium of claim 17, wherein the one or more programs further comprise instructions for:
identifying a target end user or cohort for the playlist;
generating a personalized playlist for the target end user or cohort based on preferences of the target end user or cohort; and
evaluating the personalized playlist to ensure it meets the objectives.

* * * * *